United States Patent Office 2,806,033
Patented Sept. 10, 1957

2,806,033

MORPHINE DERIVATIVE

Mozes Juda Lewenstein, Kew Gardens, N. Y., and Ulrich Weiss, Jamaica, N. Y.; said Weiss assignor to said Lewenstein No Drawing. Application August 3, 1955,
Serial No. 526,308

6 Claims. (Cl. 260—285)

This invention relates to a new morphine derivative of extremely high analgesic activity and has particular relation to a dihydromorphinone substituted by an —OH group in the molecular position shown in the structural formula further below. The invention also relates to the process for preparing the new morphine derivative and to salts of this derivative.

Ever since morphine was first isolated and used for the alleviation of pain, the need has been felt for an even more potent analgesic. Morphine, when administered in recommended doses, produces relief of pain in many conditions. However, its effect is often found insufficient in biliary and renal colics, the terminal stages of cancer and in other instances. It is not advisable to increase the dose, because of the depressing influence of morphine on respiration and heart rate. A number of morphine derivatives and synthetic compounds having morphine-like action have been made available in recent years, but the need for an analgesic which will relieve even the most severe pain has persisted. The main object of the invention is to provide a new compound of powerful effect and satisfactory chemical stability.

Another object of the present invention consists in providing a process for preparing this compound. Further objects and the advantages of the invention will be apparent from the appended claims and the following specification which describes, by way of example, some embodiments of the invention.

The new compound of our present invention corresponds to the following structural formula:

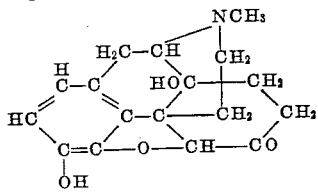

We have found that this compound can be prepared from 14-hydroxydihydrocodeinone by treating the latter with aqueous hydrobromic acid under the conditions described hereinafter. This result could not be expected. It is true that many codeine derivatives, including a number of ketonic ones, have been demethylated to the corresponding morphine derivatives; however, the chemical literature does not show any case in which this reaction was applied successfully to a codeine derivative containing a tertiary hydroxyl group. By choosing the method described hereinafter we have found it possible to remove the methyl group from 14-hydroxydihydrocodeinone without additional changes in the molecule and thus obtain 14-hydroxydihydromorphinone. We have found that the conditions described hereinafter are essential for avoiding side reactions and for the formation of a crystallizable product.

Example

90 ml. of concentrated hydrobromic acid are heated to 90° C. 9 grams of 14-hydroxydihydrocodeinone are then added under stirring and the mixture is quickly heated to 116° C. and kept at this temperature under reflux condenser for 20 minutes, with continued stirring. The resulting brown solution is diluted with about 90 ml. of water and chilled with ice. Aqueous 10% sodium hydroxide solution is now added to alkaline reaction and the liquid is extracted 3 times with 100 cc. portions of chloroform. The layers are separated and the aqueous phase is filtered and acidified by the addition of concentrated aqueous hydrochloric acid, treated with charcoal and filtered. The filtrate is treated with concentrated aqueous ammonia until the mixture gives a pink color on phenolphthalein paper. The liquid is extracted 7 times with 100 cc. portions of chloroform, the extracts are combined, dried with anhydrous sodium sulfate and evaporated. The residue is dissolved in ethanol by refluxing and the ethanol evaporated nearly to dryness. 100 cc. of benzene are then added, the mixture is refluxed for ½ hour and set aside for crystallization. After cooling, the desired compound is collected by filtration. 2.3 grams of a white crystalline powder are obtained; M. P. 245–247° C. This powder consisting of 14-hydroxydihydromorphinone can be purified by recrystallization from benzene, ethylacetate or ethanol. From benzene it generally forms diamond shaped platelets, while needles are obtained from ethylacetate.

On heating, the crystals are discolored from about 200° on, and melt at 246–247° to a black liquid, which decomposes with strong volume increase, if the temperature is raised further by a few degrees.

Elementary analysis of the compound agrees well with the formula $C_{17}H_{19}NO_4$, corresponding to the structural formula given above.

In the foregoing example, the reaction mixture may be heated at 105° to 120° C. for from 20 to 50 minutes, the time of reaction depending upon the temperature employed.

The phenolic nature of the base is shown by its reaction with ferric chloride. Addition of one drop of aqueous $FeCl_3$ solution to an aqueous suspension of the pure compound produces a beautiful blue color. Furthermore the base dissolves readily in dilute aqueous NaOH, giving a clear, colorless solution. Addition of an alcoholic solution of m-dinitrobenzene to the alkaline liquid produces a pink to red color; this reaction is considered to indicate the presence of the group —CO—CH$_2$—. The constitution of the compound as 14-hydroxydihydromorphinone is proven not only by the reactions described above, but in addition by its methylation with diazomethane, which readily reconverts the compound to 14-hydroxydihydrocodeinone. Mixed melting points of this compound with the starting material and of the hydrochlorides and the oxims of both products did not show any depression. This proves that in the heating of 14-hydroxydihydrocodeinone with concentrated HBr no structural change beyond the demethylation has taken place. 14-hydroxydihydromorphinone forms a crystalline, non-hygroscopic hydrochloride; other salts, of any organic or inorganic acid can be prepared in conventional manner, for example the bromide, iodide, sulfate, phosphates, such as orthophosphates and metaphosphate, nitrite, nitrate, bitartrate, salicylate, terephthalate, acetate, propionate, phthalate, benzoate, camphosulfonate, citrate and others can be prepared.

The new compound of the invention and its salts, can be used as analgesics, if desired in mixture with other therapeutically active substances, for example other analgesics and other therapeutic agents.

It has been stated in the art that attempts to demethylate dihydrohydroxycodeinone with 48% hydrobromic acid or hydriodic acid resulted in non-crystalline products. This cannot be considered a showing of 14-dihydrohydroxymorphinone or an attempt to prepare 14-dihydrohydroxymorphinone in view of the absence of any case in the art, in which a morphine derivative containing a tertiary alcohol group could be demethylated with an acid without other structural changes.

Reference is made to our co-pending application filed in our names under Serial No. 228,978 on May 29, 1951, of which this is a continuation-in-part.

What is claimed is:

1. As a new compound 14-hydroxydihydromorphinone consisting of a crystalline substance having a melting point of 245°–247° C.

2. As a new compound a salt of 14-hydroxydihydromorphinone.

3. As a new compound 14-hydroxydihydromorphinone hydrochloride.

4. A new compound selected from the group of 14-hydroxydihydromorphinone consisting of a crystalline substance having a melting point of 245°–247° C. and its salts.

5. A process for preparing 14-hydroxydihydromorphinone, comprising heating 14-hydroxydihydrocodeinone with concentrated aqueous HBr to a temperature slightly below the boiling point; diluting the reaction mixture with water and cooling the diluted mixture, rendering the cooled solution alkaline and extracting it with chloroform; acidifying the aqueous phase and subsequently adding thereto ammonia to alkaline reaction; and extracting the reaction product from the liquid with chloroform.

6. A process as claimed in claim 5, in which the chloroform extract is evaporated and the residue is treated with alcohol.

References Cited in the file of this patent

Lutz et al.: J. Org. Chemistry, vol. 4, pp. 220–228, 1939.